US012667912B2

(12) United States Patent (10) Patent No.: US 12,667,912 B2
Ito (45) Date of Patent: Jun. 30, 2026

(54) LASER PROCESSING MACHINE AND LASER PROCESSING METHOD

(71) Applicant: AMADA CO., LTD., Kanagawa (JP)

(72) Inventor: Ryohei Ito, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 485 days.

(21) Appl. No.: 18/277,991

(22) PCT Filed: Feb. 15, 2022

(86) PCT No.: PCT/JP2022/005950
§ 371 (c)(1),
(2) Date: Aug. 20, 2023

(87) PCT Pub. No.: WO2022/181397
PCT Pub. Date: Sep. 1, 2022

(65) Prior Publication Data
US 2024/0123543 A1 Apr. 18, 2024

(30) Foreign Application Priority Data
Feb. 26, 2021 (JP) .............................. JP2021-029795

(51) Int. Cl.
*B23K 26/064* (2014.01)
*B23K 26/073* (2006.01)
(52) U.S. Cl.
CPC ........ *B23K 26/0648* (2013.01); *B23K 26/073* (2013.01)
(58) Field of Classification Search
CPC .............. B23K 26/0648; B23K 26/067; B23K 26/0676; B23K 26/073
See application file for complete search history.

(56) References Cited

U.S. PATENT DOCUMENTS

2009/0032510 A1* 2/2009 Ando ................. B23K 26/0676
219/121.72
2010/0051830 A1* 3/2010 Machida ............... H10P 14/382
250/492.2
(Continued)

FOREIGN PATENT DOCUMENTS

CN 102869474 A 1/2013
CN 111715997 A 9/2020
(Continued)

OTHER PUBLICATIONS

International Search Report for corresponding Application No. PCT/JP2022/005950, mailed Apr. 5, 2022.
(Continued)

*Primary Examiner* — Scott J Walthour
(74) *Attorney, Agent, or Firm* — Renner, Otto, Boisselle & Sklar, LLP

(57) ABSTRACT

A laser processing machine includes a collimating lens configured to convert a laser beam into a collimated beam, a condensing lens configured to focus the collimated beam onto a sheet metal, a first lens arrays structured by arranging a plurality of first microlenses in a planar shape so as to refract the laser beam by each of the first microlenses, a second lens array structured by arranging a plurality of second microlenses in a planar shape so that a center thereof is set at a same position in an optical axis direction as a center of the first lens array so as to make the laser beam emitted from each of the first microlenses incident and refracted by a corresponding one of the second microlenses, and a rotation mechanism configured to rotate at least one of the first lens array and the second lens array along an outer periphery thereof.

5 Claims, 10 Drawing Sheets

(56)  References Cited

U.S. PATENT DOCUMENTS

| | | | |
|---|---|---|---|
| 2013/0044371 | A1 | 2/2013 | Rupp et al. |
| 2013/0284708 | A1* | 10/2013 | Mizumura ........... B23K 26/382 |
| | | | 219/121.7 |
| 2014/0259659 | A1* | 9/2014 | Kleinert .............. H01S 3/10053 |
| | | | 219/121.81 |
| 2020/0189029 | A1 | 6/2020 | Ishiguro et al. |

FOREIGN PATENT DOCUMENTS

| | | | |
|---|---|---|---|
| JP | 5767315 | B2 | 6/2015 |
| JP | 6419901 | B1 | 10/2018 |

OTHER PUBLICATIONS

Written Opinion for corresponding Application No. PCT/JP2022/ 005950, mailed Apr. 5, 2022.

* cited by examiner

Fig. 2

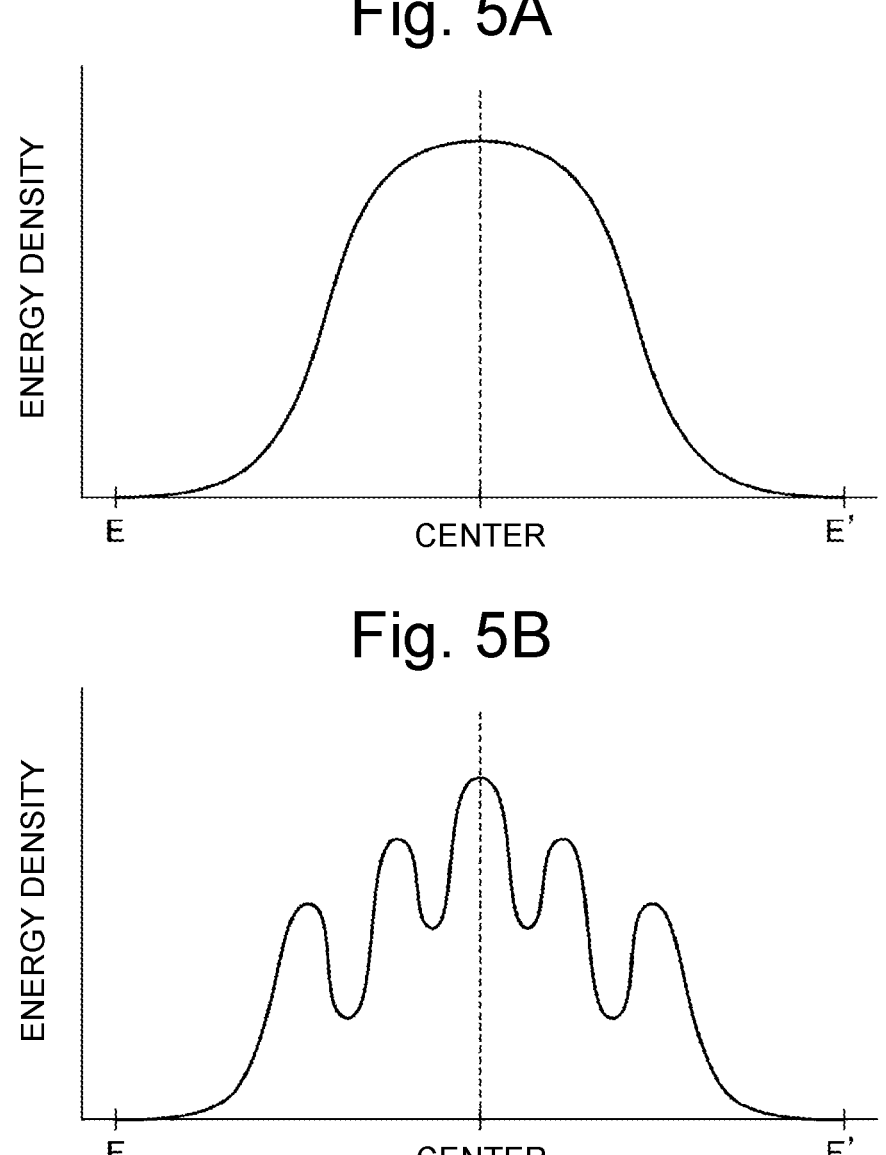

LASER PROCESSING MACHINE AND LASER PROCESSING METHOD

TECHNICAL FIELD

The present disclosure relates to a laser processing machine and a laser processing method.

BACKGROUND ART

A laser processing machine that cuts a sheet metal with a laser beam emitted from a laser oscillator is widely used. The laser processing machine can increase a laser absorption rate in the sheet metal for efficiently carrying out cutting by appropriately setting an incident angle of the laser beam to the sheet metal (for example, setting the incident angle to about 80°).

On the other hand, in the cutting of the sheet metal with the laser beam, it is necessary to appropriately adjust a cut slit width in accordance with a thickness in order to efficiently discharge a molten metal. Specifically, it is necessary to widen the cut slit width as the thickness increases.

In other words, when the cutting of the sheet metal is carried out with the laser beam, the incident angle of the laser beam to the sheet metal and the cut slit width are important parameters.

CITATION LIST

Patent Literature

Patent Literature 1: Japanese Patent No. 6419901
Patent Literature 2: Japanese Patent No. 5767315

SUMMARY

In order to widen the cut slit width of the laser beam when a thick sheet metal is cut, a condensing diameter of the laser beam must be increased. However, if the condensing diameter is increased without changing a beam-parameter product, the incident angle of the laser beam is decreased. In other words, since an energy density relative to an area of the sheet metal to be irradiated is lowered, it is necessary to increase an output or lower a cutting velocity in order to compensate in such a manner that the sheet metal is irradiated with the same amount of the laser beam as the one when the condensing diameter is small. However, there are limitations to it. Therefore, when the thick sheet metal is cut, there is a problem that it is difficult to cut the sheet metal with an appropriate slit width while maintaining a high laser absorption rate. Further, when the incident angle of the laser beam is decreased, an emission angle of the laser beam emitted to a cutting front becomes close to 90°, which is further away from a Brewster angle and the absorption ratio in the sheet metal is lowered. This is a problem that makes the sheet metal difficult to be molten.

A laser processing machine according to one aspect of the present disclosure includes a collimating lens configured to convert an incident laser beam into a collimated beam, a condensing lens configured to focus the converted collimated beam so as to irradiate a sheet metal, a first lens array structured by arranging a plurality of first microlenses in a planar shape so as to refract the incident laser beam by each of the first microlenses, a second lens array structured by arranging a plurality of second microlenses in a planar shape to be in a same shape as the first lens array so that a center thereof is set at a same position in an optical axis direction as a center of the first lens array so as to make the laser beam emitted from each of the microlenses of the first lens array incident and refracted by a corresponding one of the second microlenses, and a rotation mechanism configured to rotate at least one of the first lens array and the second lens array along an outer periphery thereof.

As a result, in the laser processing machine according to the one aspect of the present disclosure, when a sheet metal to be cut is irradiated with the laser beam made incident in a state in which the first lens array or the second lens array is rotated, it is possible to set a plurality of high-absorption rate areas to the sheet metal. Therefore, the laser processing machine according to the one aspect of the present disclosure makes it possible to change the condensing diameter to the one that can secure a desired slit width for carrying out the cutting while controlling the incident angle to be close to the Brewster angle so as to maintain the high laser absorption rate in the sheet metal.

Further, a laser processing method according to the one aspect of the present disclosure includes rotating at least one of the first lens array and the second lens array along an outer periphery thereof by a predetermined angle with the rotation mechanism such that a condensing diameter of a laser beam condensed by the condensing lens of the laser processing machine becomes a predetermined size.

As a result, in the laser processing method according to the one aspect of the present disclosure, when a sheet metal to be cut is irradiated with the laser beam made incident in a state in which the first lens array or the second lens array is rotated, it is possible to set a plurality of high-absorption rate areas to the sheet metal. Therefore, the laser processing method according to the one aspect of the present disclosure makes it possible to change the condensing diameter to the one that can secure a desired slit width for carrying out the cutting while controlling the incident angle to be close to the Brewster angle so as to maintain the high laser absorption rate in the sheet metal.

According to the laser processing machine and the laser processing method according to the one aspect of the present invention, it is possible to carry out the cutting with the condensing diameter that can secure the desired slit width in accordance with the thickness of the sheet metal while controlling the incident angle to be close to the Brewster angle so as to maintain the high laser absorption rate in the sheet metal to be cut.

BRIEF DESCRIPTION OF DRAWINGS

FIG. 2 is a diagram showing a structural example of a collimator unit provided to the laser processing machine according to the one embodiment.

FIG. 5A is a graph showing an energy density distribution, on the first lens array, of the laser beam made incident to the laser processing machine according to the one embodiment.

FIG. 5B is a graph showing the energy density distribution, on the second lens array, of the laser beam made incident to the laser processing machine according to the one embodiment.

DESCRIPTION OF EMBODIMENTS

Figure 1:
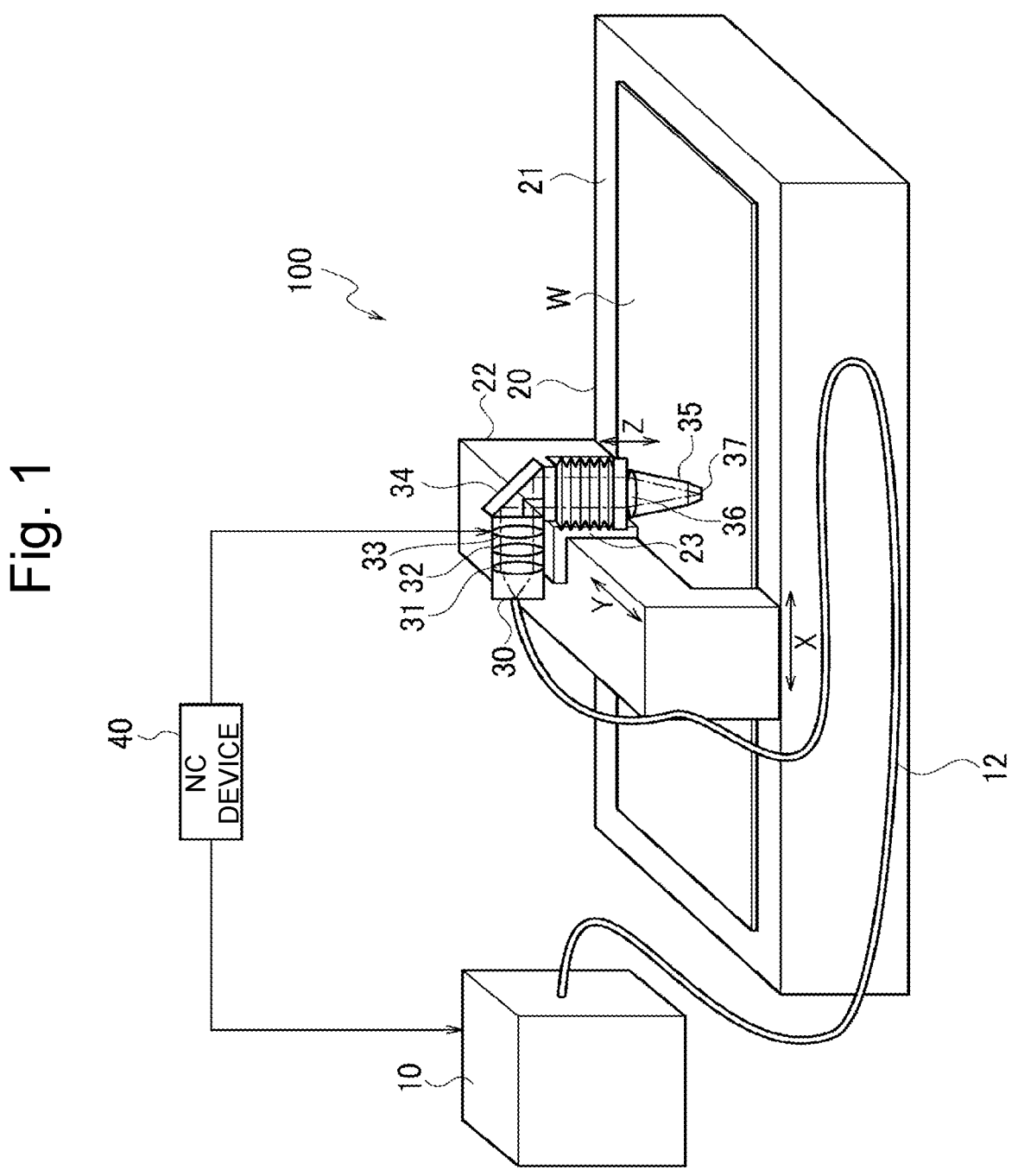
FIG. 1 is an overall view showing a structure of a laser processing machine according to one embodiment.
Figure 2:
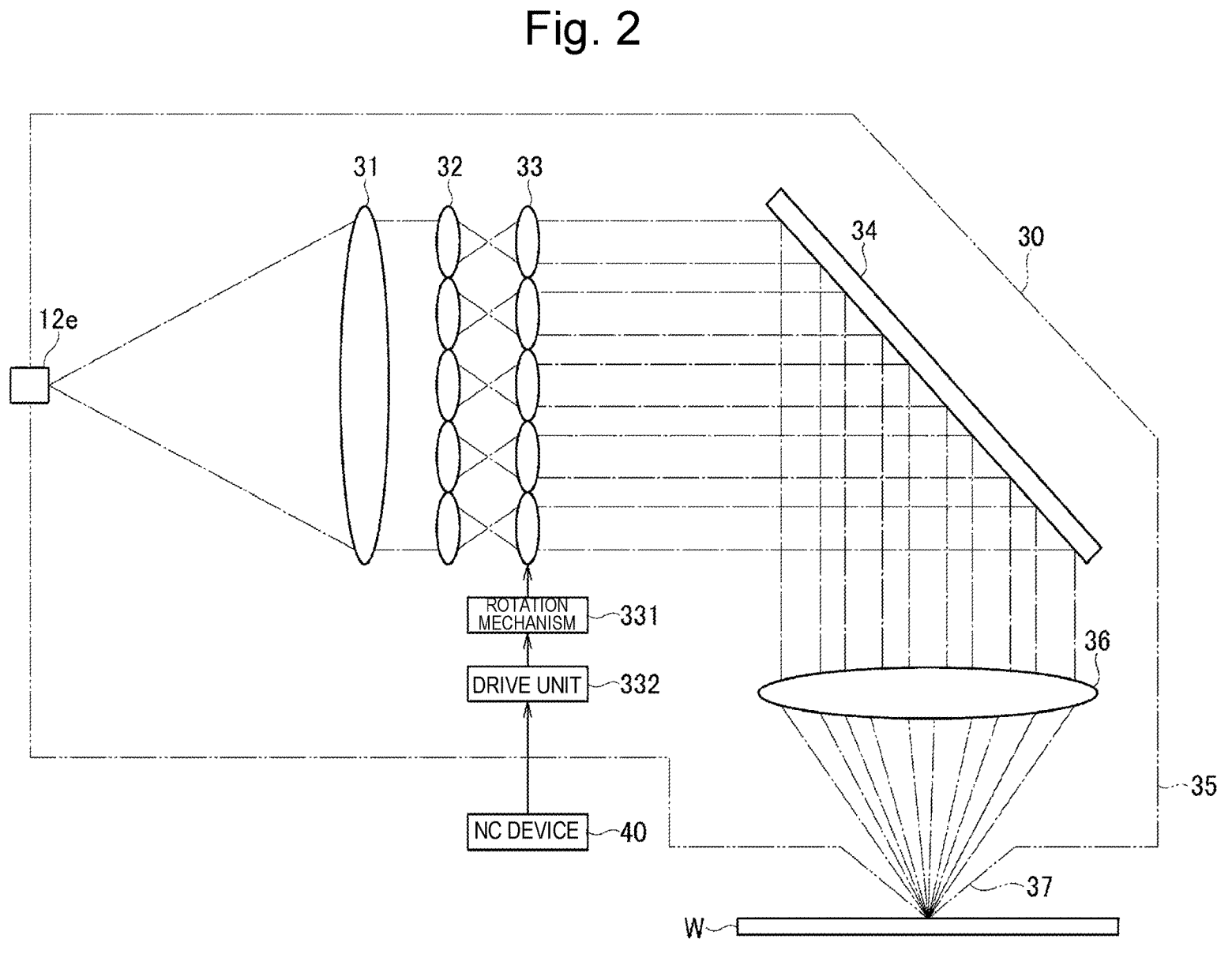
Figure 3A:
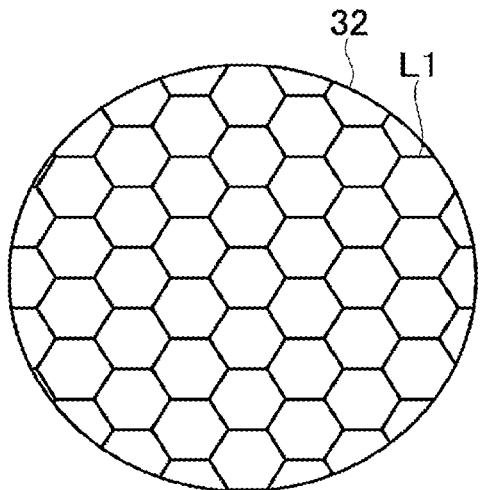
FIG. 3A is a front view of a first lens array of the laser processing machine according to the one embodiment.
Figure 3B:
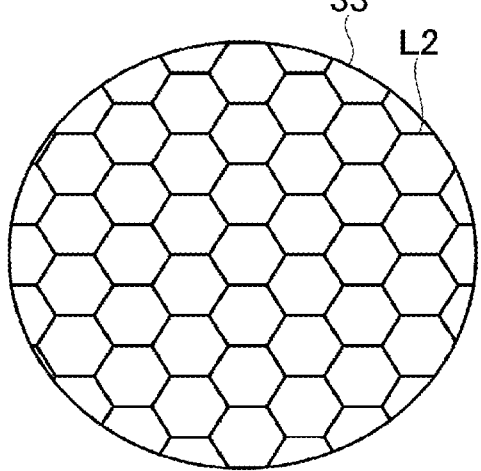
FIG. 3B is a front view of a second lens array of the laser processing machine according to the one embodiment.

A laser processing machine according to one embodiment will be described below with reference to the accompanying drawings. FIG. 1 is an overall view showing a structure of a laser processing machine 100 according to the one embodiment. FIG. 2 is a diagram showing a structural example of a collimator unit 30 provided to the laser processing machine 100 according to the one embodiment. FIG. 3A is a front view of a first lens array 32 of the laser processing machine 100 according to the one embodiment. FIG. 3B is a front view of a second lens array 33 of the laser processing machine 100 according to the one embodiment.

The laser processing machine 100 according to the one embodiment includes a collimating lens 31 configured to convert an incident laser beam into a collimated beam, a condensing lens 36 configured to focus the converted collimated beam so as to irradiate a sheet metal, a first lens array 32 structured by arranging a plurality of first microlenses L1 in a planar shape so as to refract the incident laser beam by each of the first microlenses L1, a second lens array 33 structured by arranging a plurality of second microlenses L2 in a planar shape to be in a same shape as the first lens array 32 so that a center thereof is set at a same position in an optical axis direction as a center of the first lens array 32 so as to make the laser beam emitted from each of the microlenses L1 of the first lens array 32 incident and refracted by a corresponding one of the second microlenses L2, and a rotation mechanism 331 configured to rotate at least one of the first lens array 32 and the second lens array 33 along an outer periphery thereof.

The microlens of the first lens array 32 and the microlens of the second lens array 33 provided to the laser processing machine 100 according to the one embodiment are formed in a regular hexagon or a square.

A focal length of the microlens of the second lens array 33 provided to the laser processing machine 100 according to the one embodiment is set shorter than a focal length of the microlens of the first lens array 32.

The first lens array 32 and the second lens array 33 provided to the laser processing machine 100 according to the one embodiment are arranged between the collimating lens 31 and the condensing lens 36.

As shown in FIG. 1, the laser processing machine 100 includes a laser oscillator 10 that generates and emits the laser beam, a laser processing unit 20, and a process fiber 12 that transmits the laser beam emitted from the laser oscillator 10 to the laser processing unit 20. Further, the laser processing machine 100 is provided with an NC device 40 that controls the entire laser processing machine 100. The NC device 40 is an example of a control device.

The laser processing machine 100 cuts a sheet metal W by the laser beam emitted from the laser oscillator 10. As the laser oscillator 10, a laser oscillator that amplifies an excitation beam emitted from a laser diode and emits a laser beam of a predetermined wavelength, or a laser oscillator that directly uses a laser beam emitted from the laser diode are preferable. The laser oscillator 10 is, for example, a solid-state laser oscillator, a fiber laser oscillator, a disk laser oscillator, or a direct diode laser oscillator (a DDL oscillator).

The process fiber 12 is attached along cable ducts (not shown) of an X axis and a Y axis arranged in the laser processing unit 20.

The laser processing unit 20 includes a processing table 21 on which the sheet metal W is placed, an X-axis carriage 22 in a gate shape that is movable on the processing table 21 in an X-axis direction, and a Y-axis carriage 23 that is movable in a Y direction perpendicular to an X axis on the X-axis carriage 22. Further, the laser processing unit 20 includes the collimator unit 30 fixed to the Y-axis carriage 23.

The collimator unit 30 includes the collimating lens 31 to which the laser beam emitted from an emission end of the process fiber 12 is made incident, the first lens array 32 to which the laser beam emitted from the collimating lens 31 is made incident, and the second lens array 33 to which the laser beam emitted from the first lens array 32 is made incident, all of which are arranged at predetermined positions. The collimating lens 31, the first lens array 32, and the second lens array 33 are arranged side by side in the optical axis direction of the incident laser beam. Further, the center of the second lens array 33 is arranged so as to be at the same position as the center of the first lens array 32 in the optical axis direction.

The collimating lens 31 is a lens with a positive focal length, and converts the incident laser beam into a parallel beam (collimated beam). Detailed structures of the first lens array 32 and the second lens array 33 will be described later. Further, the collimator unit 30 includes a bend mirror 34 that reflects the laser beam emitted from the second lens array 33 downward in a Z-axis direction perpendicular to the X-axis and the Y-axis.

The collimator unit 30 is fixed to the Y-axis carriage 23 that is movable in the Y-axis direction, and the Y-axis carriage 23 is provided on the X-axis carriage 22 that is movable in the X-axis direction. Therefore, the laser processing unit 20 can move, in the X-axis direction and the Y-axis direction, a position from which the laser beam emitted from a nozzle 37 is emitted to the sheet metal W.

Further, the laser processing unit 20 includes, below the collimator unit 30, a processing head 35 connected to the collimator unit 30. The processing head 35 includes the condensing lens 36 that focuses the laser beam reflected by the bend mirror 34 so as to irradiate the sheet metal W. The condensing lens 36 is a lens having a positive focal length. The nozzle 37 that can be installed and removed and emits the laser beam is attached to a tip end of the processing head 35.

The collimator unit 30, the processing head 35, and the nozzle 37 constitute a beam irradiation unit that irradiates the sheet metal W with the laser beam after converting the laser beam, which is a divergent beam, into the collimated beam and focusing the collimated beam.

With the above structure, the laser processing machine 100 can transmit the laser beam, which is emitted from the laser oscillator 10, to the laser processing unit 20 through the process fiber 12, so as to irradiate the sheet metal W with the laser beam focused by the condensing lens 36 to cut the sheet metal W.

Next, a structural example of the collimator unit 30 will be described with reference to FIG. 2. As shown in FIG. 2, the first lens array 32 and the second lens array 33 in the collimator unit 30 are arranged between the collimating lens 31 and the condensing lens 36. Further, the second lens array 33 is attached to the rotation mechanism 331 for rotating the second lens array 33 along the outer periphery thereof.

A drive unit 332 causes the rotation mechanism 331 to rotate at least one of the first lens array 32 and the second lens array 33 along the outer periphery by a predetermined angle so that the condensing diameter of the laser beam condensed by the condensing lens 36 becomes a predetermined size. Note that in the present embodiment, the rotation mechanism 331 rotates the second lens array 33.

The second lens array 33 rotates along the outer periphery of the second lens array 33 when the drive unit 332 drives the rotation mechanism 331. As a result, the rotation mechanism 331 can rotate the second lens array 33 with the center of the second lens array 33 as an axis. The drive unit 332 is, for example, a motor. The NC device 40 controls the drive unit 332. Another control device connected to the NC device 40 may control the drive unit 332.

Here, the first lens array 32 and the second lens array 33 will be described with reference to FIGS. 3A and 3B. As shown in FIG. 3A, the first lens array 32 is structured by arranging the plurality of first microlenses L1 in a planar shape. Further, as shown in FIG. 3B, the second lens array 33 is structured in a same shape as the first lens array 32 by arranging the plurality of second microlenses L2 in a planar shape. In the present embodiment, the first microlens L1 and the second microlens L2 are each formed in a regular hexagon. Further, the focal length of each of the second microlenses L2 is set shorter than the focal length of each of the first microlenses L1.

Next, referring to FIGS. 2 and 4A to 5B, operations executed by the laser processing machine 100 will be described when the first lens array 32 and the second lens array 33 are arrange side by side in the collimator unit 30 such that a position of each of the first microlenses L1 and a position of each of the second microlenses L2 are aligned in the optical axis direction.

Figures 4A, 4B, 4C:
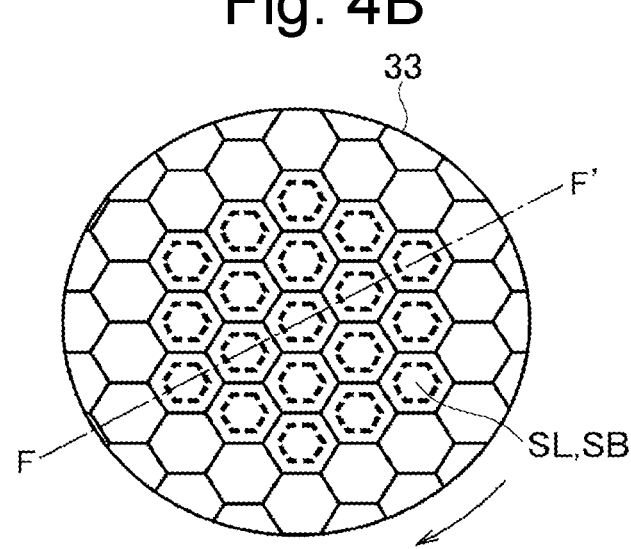
FIG. 4A is a diagram showing a position of a laser beam made incident to the first lens array when positions of microlenses of the first lens array and the second lens array of the laser processing machine according to the one embodiment are aligned.
FIG. 4B is a diagram showing a position of a laser beam made incident to the second lens array when the positions of the microlenses of the first lens array and the second lens array of the laser processing machine according to the one embodiment are aligned.
FIG. 4C is a diagram showing a size of the laser beam (convergent beam) on the sheet metal, which is emitted in a state in which the positions of the microlenses of the first lens array and the second lens array of the laser processing machine according to the one embodiment are aligned.

FIG. 4A is a diagram showing a position of the laser beam made incident to the first lens array 32 when the positions of the microlenses of the first lens array 32 and the second lens array 33 of the laser processing machine 100 according to the one embodiment are aligned. FIG. 4B is a diagram showing a position of the laser beam made incident to the second lens array 33 when the positions of the microlenses of the first lens array 32 and the second lens array 33 of the laser processing machine 100 according to the one embodiment are aligned. FIG. 4C is a diagram showing a size of the laser beam (convergent beam) on the sheet metal, which is emitted in a state in which the positions of the microlenses of the first lens array 32 and the second lens array 33 of the laser processing machine 100 according to the one embodiment are aligned.

FIG. 5A is a graph showing an energy density distribution, on the first lens array 32, of the laser beam made incident to the laser processing machine 100 according to the one embodiment. FIG. 5B is a graph showing the energy density distribution, on the second lens array 33, of the laser beam made incident to the laser processing machine 100 according to the one embodiment.

As shown in FIG. 2, when the laser beam is emitted from an emission end 12e of the process fiber 12 as indicated by the alternate long and short dash line, the collimating lens 31 converts the emitted laser beam into the parallel beam (the collimated beam). The parallel beam here means that a luminous flux of the laser beam is the parallel beam. The parallel beam emitted from the collimating lens 31 is made incident to the first microlenses L1 in a center range corresponding to a core diameter of the luminous flux in the first lens array 32, as indicated by the dotted line in FIG. 4A. At this time, the energy density distribution of the laser beam on the alternate long and short dash line E-E' of the first lens array 32 becomes a curve with a peak at a single point in a center, as shown in FIG. 5A.

Each of the first microlenses L1 to which the laser beam is made incident refracts the laser beam and focuses the laser beam onto a position separated by a predetermined focal length. The laser beam that has passed through a focal point is made incident within a predetermined range of the center of each of the corresponding second microlenses L2 in the second lens array 33, as indicated by the dotted line in FIG. 4B. At this time, as shown in FIG. 5B, the energy density distribution of the laser beam on the dashed-dotted line F-F' of the second lens array 33 is in a state in which peaks are dispersed for each of the second microlenses L2 and higher as closer to the center. Further, at this time, a center position SL of each of the second microlenses L2 to which the laser beam is made incident coincides with a center SB of the laser beam made incident to the second microlens L2. Each of the second microlenses L2 to which the laser beam is made incident converts the laser beam into the parallel beam.

The parallel beam emitted from each of the second microlenses L2 is reflected by the bend mirror 34, and is made incident to the condensing lens 36 after an optical path thereof is bent. The condensing lens 36 focuses the parallel beam such that the focusing position is on a surface of the sheet metal W or at a vicinity thereof, and irradiates the sheet metal W with the laser beam. In this case, the laser beam emitted to the sheet metal W is condensed at one point as shown in FIG. 4C.

A condensing diameter d of a condensed point at this time is expressed by the following expression (1).

[Expression 1]

$$d = \frac{f_{focus}}{f_{collimate}} \times d_{core} \tag{1}$$

Here, $f_{collimate}$ is the focal length of the collimating lens 31, $f_{focus}$ is the focal length of the condensing lens 36, and $d_{core}$ is a core diameter of the laser beam.

Next, referring to FIGS. 2 and FIGS. 6A to 7, operations executed by the laser processing machine 100 will be described when the position of each of the corresponding microlenses is shifted by rotating the second lens array 33 along the outer periphery by a predetermined angle in the direction of the arrow in FIG. 4B from a state in which the position of each of the first microlenses L1 of the first lens array 32 and the position of each of the corresponding second microlenses L2 of the second lens array 33 are aligned.

Figure 6A:
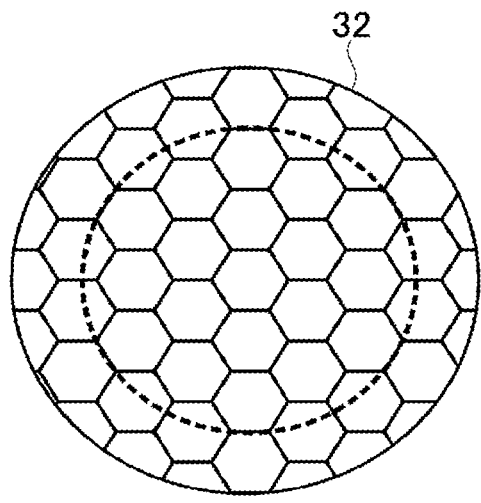
FIG. 6A is a diagram showing a position of the laser beam made incident to the first lens array when the positions of the microlenses of the first lens array and the second lens array of the laser processing machine according to the one embodiment are not aligned.
Figure 6B:
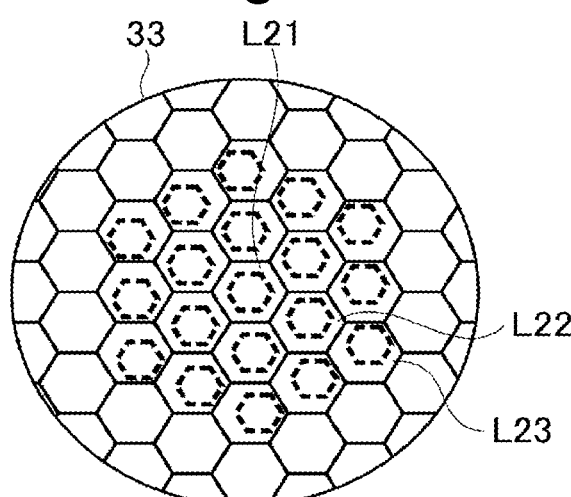
FIG. 6B is a diagram showing a position of the laser beam made incident to the second lens array when the positions of the microlenses of the first lens array and the second lens array of the laser processing machine according to the one embodiment are not aligned.
Figure 6C:
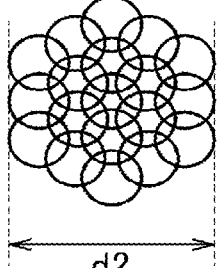
FIG. 6C is a diagram showing a size of the laser beam (convergent beam) on the sheet metal, which is emitted in a state in which the positions of the microlenses of the first lens array and the second lens array of the laser processing machine according to the one embodiment are not aligned.

FIG. 6A is a diagram showing the position of the laser beam made incident to the first lens array 32 when the positions of the microlenses of the first lens array 32 and the second lens array 33 of the laser processing machine 100 according to the one embodiment are not aligned. FIG. 6B is a diagram showing the position of the laser beam made incident to the second lens array 33 when the positions of the microlenses of the first lens array 32 and the second lens array 33 of the laser processing machine 100 according to the one embodiment are not aligned. FIG. 6C is a diagram showing a size of the laser beam (the convergent beam) on the sheet metal, which is emitted in a state in which positions of the microlenses of the first lens array and the second lens array of the laser processing machine according to the one embodiment are not aligned.

Figure 7:
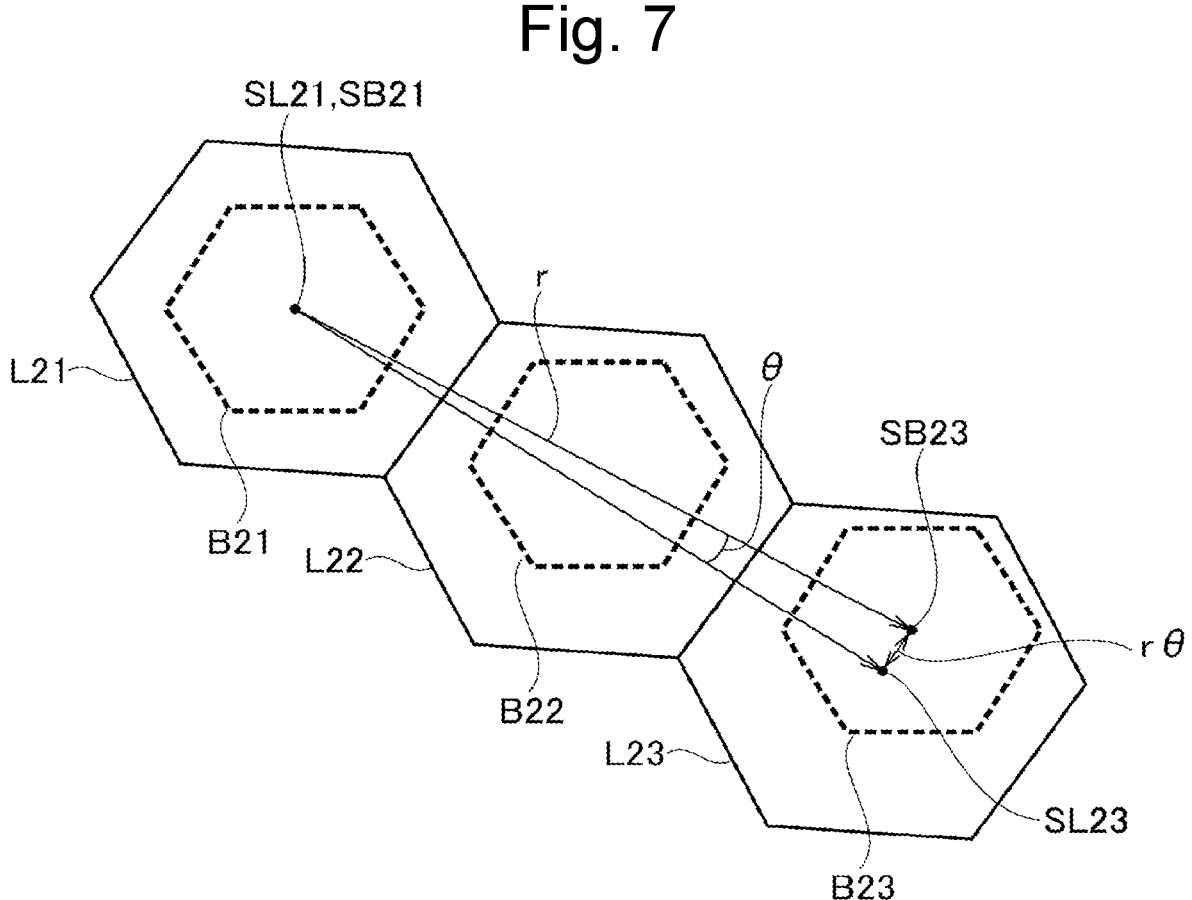
FIG. 7 is an enlarged view showing some of the microlenses in the second lens array and the laser beams made incident to some of the microlenses in the second lens array of the laser processing machine according to the one embodiment.

FIG. 7 is an enlarged view showing some of the microlenses in the second lens array 33 and the laser beams made incident to some of the microlenses in the second lens array 33 of the laser processing machine 100 according to the one embodiment.

In this case, when the laser beam is emitted from the emission end 12e of the process fiber 12 and converted into the parallel beam by the collimating lens 31, the laser beam is made incident to the first microlenses L1 within the central range corresponding to the core diameter of the luminous flux in the first lens array 32, as indicated by the dotted line in FIG. 6A.

Each of the first microlenses L1 to which the laser beam is made incident focuses the laser beam onto the position separated by a predetermined focal length. The laser beam that has passed through the focal point is made incident within a predetermined range of the respective corresponding second microlenses L2 in the second lens array 33, as indicated by the dotted lines in FIG. 6B. Here, the laser beam is made incident to the central range with respect to the second microlens L21 at the center of the second lens array 33, but the laser beam is made incident to the range shifted from the center of the corresponding second microlens L2 with respect to the second microlenses L2 other than L21. As a result, the shift occurs between the center positions SL of the second microlenses L2 other than the second microlens L21 to which the laser beam is made incident and the center SB of the laser beam made incident to the corresponding second microlenses L2.

At this time, since the focal length of the second microlens L2 is set shorter than the focal length of the first microlens L1, even if the shift occurs between the center position SL of the second microlens L2 and the center SB of the laser beam made incident to the corresponding second microlens L2, it is possible to make the laser beam incident within the second microlens L2.

When the shift occurs between the center position SL of the second microlens L2 and the center SB of the laser beam made incident to the corresponding second microlens L2, the focusing positions are shifted of a plurality of the laser beams emitted from the respective second microlenses L2 and reflected by the bend mirror 34 when focused by the condensing lens 36. This shift is larger as the position of the corresponding microlens L2 moves away from the center of the second lens array 33.

As an example, FIG. 7 shows an enlarged view of the second microlens L21 arranged at the center position of the second lens array 33 and a laser beam B21 made incident to L21, a second microlens L22 adjacent to L21 and a laser beam B22 made incident to L22, and a second microlens L23 adjacent to L22 and a laser beam B23 made incident to L23. Here, the second microlens L23 is the second microlens L2 that is at a position farthest from the second microlens L21 in the second lens array 33 (an outermost position in the second lens array 33).

Here, the center position of the second microlens L21 is defined as SL21, the center position of the laser beam B21 is defined as SB21, the center position of the second microlens L23 is defined as SL23, the center position of the laser beam B23 is defined as SB23, and a rotation angle of the second lens array 33 is defined as θ. Then, SL21 and SB21 are aligned, but an angle θ is formed between a straight line connecting SL21 and SL23 and a straight line connecting SB21 and SB23.

As a result, as shown in FIG. 6C, the focusing positions of the plurality of laser beams emitted from the respective second microlenses L2 of the second lens array 33 and reflected by the bend mirror 34 are shifted, when the laser beams are focused by the condensing lens 36. As a result, a condensing diameter d2 is increased in a pseudo manner. The condensing diameter d2 at this time is expressed by the following expression (2).

[Expression 2]

$$d2 = 2r\theta\left(\frac{f_{focus}}{f_{array}}\right) + d \qquad (2)$$

Here, r is a distance from the center position SL21 of the second microlens L21 arranged at the center position of the second lens array 33 to the center position SL23 of the outermost second microlens L23 to which the laser beam is made incident, θ is the rotation angle of the second lens array 33, $f_{array}$ is the focal length of each of the second microlenses L2 of the second lens array 33, and d is the condensing diameter with which the laser beam emitted from each of the second microlenses L2 of the second lens array 33 is condensed by the condensing lens 36.

FIGS. 8A to 8F show simulation results when the condensing diameter of the laser beam is changed by changing the rotation angle of the second lens array 33 in the laser processing machine 100 structured as described above. Here, a fiber core diameter of the laser beam emitted from the process fiber 12 is set to φ100 μm, the focal length of the collimating lens 31 is set to f120, the focal length of each of the first microlenses L1 in the first lens array 32 is set to f44.5, the focal length of each of the second microlenses L2 in the second lens array 33 is set to f42.3, and the focal length of the condensing lens 36 is set to f150. Further, FIG. 9 shows an absorption rate relative to the incident angle when the laser beam is made incident to the sheet metal.

Figure 8A:
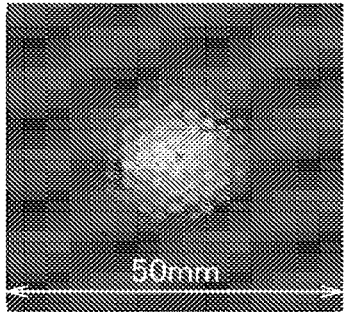
FIG. 8A is a diagram showing imaging information of the laser beam emitted to a condensing lens in a state in which the second lens array of the laser processing machine according to the one embodiment is not rotated.
Figure 8B:
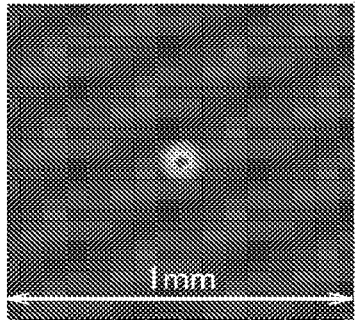
FIG. 8B is a diagram showing the imaging information of the laser beam condensed on the sheet metal in the state shown in FIG. 8A.
Figure 9:
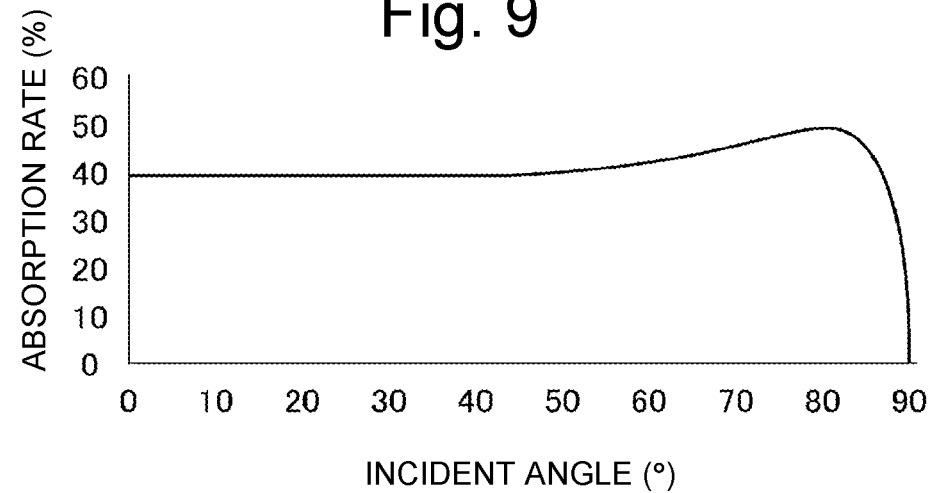
FIG. 9 is a graph showing an absorption rate relative to the incident angle when the laser beam emitted by the laser processing machine according to the one embodiment is made incident to the sheet metal.

FIG. 8A is a diagram showing imaging information of the laser beam emitted to the condensing lens 36 in a state in which the second lens array 33 of the laser processing machine 100 according to the one embodiment is not rotated (the rotation angle 0°). FIG. 8B is a diagram showing the imaging information of the laser beam condensed on the sheet metal W in the state shown in FIG. 8A.

Figure 8C:
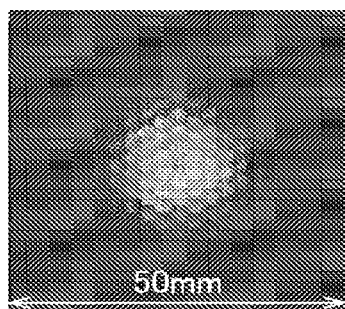
FIG. 8C is a diagram showing the imaging information of the laser beam emitted to the condensing lens in a state in which the second lens array of the laser processing machine according to the one embodiment is rotated by a predetermined angle (No. 1).
Figure 8D:
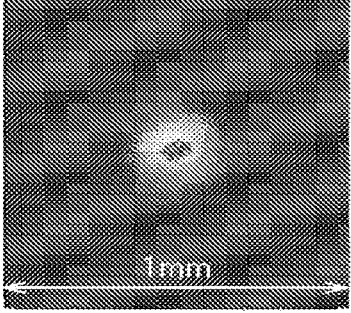
FIG. 8D is a diagram showing the imaging information of the laser beam condensed on the sheet metal in the state shown in FIG. 8C.

FIG. 8C is a diagram showing the imaging information of the laser beam emitted to the condensing lens 36 in a state in which the second lens array 33 of the laser processing machine 100 according to the one embodiment is rotated by a predetermined angle (0.2° along the outer periphery). FIG. 8D is a diagram showing the imaging information of the laser beam condensed on the sheet metal W in the state shown in FIG. 8C.

Figure 8E:
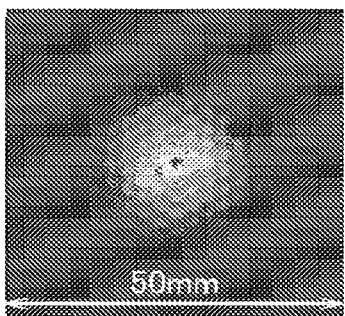
FIG. 8E is a diagram showing the imaging information of the laser beam emitted to the condensing lens in the state in which the second lens array of the laser processing machine according to the one embodiment is rotated by a predetermined angle (No. 2).
Figure 8F:
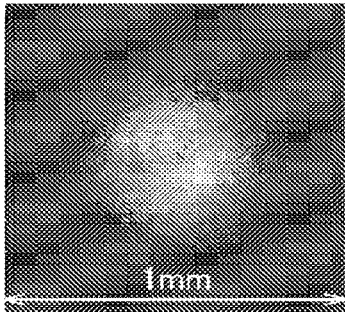
FIG. 8F is a diagram showing the imaging information of the laser beam condensed on the sheet metal in the state shown in FIG. 8E.

FIG. 8E is a diagram showing the imaging information of the laser beam emitted to the condensing lens 36 in a state in which the second lens array 33 of the laser processing machine 100 according to the one embodiment is rotated by a predetermined angle (0.4° along the outer periphery). FIG. 8F is a diagram showing the imaging information of the laser beam condensed on the sheet metal W in the state shown in FIG. 8E.

FIG. 9 is a graph showing the absorption rate relative to the incident angle when the laser beam emitted by the laser processing machine 100 according to the one embodiment is made incident to the sheet metal W.

A horizontal width of the imaging information in FIGS. 8A, 8C, and 8E is 50 mm, and the horizontal width of the imaging information in FIGS. 8B, 8D, and 8F is 1 mm.

These simulation results show that a beam diameter of the laser beam emitted to the condensing lens 36 hardly changes regardless of whether or not the second lens array 33 is rotated, as shown in FIGS. 8A, 8C, and 8E. If the beam diameter of the laser beam emitted to the condensing lens 36 does not change, the incident angle of the laser beam to the sheet metal W does not change, either. The absorption rate relative to the incident angle when the laser beam is made incident to the sheet metal is shown as in the graph of FIG. 9, and the incident angle with the highest absorption rate (about 80°) is a Brewster angle. Therefore, by setting the incident angle of the laser beam to the sheet metal W to be close to the Brewster angle, it is possible to maintain the incident angle even if the second lens array 33 is rotated, thereby making it possible to ensure a constant laser absorption rate and energy density on the sheet metal W.

On the other hand, as shown in FIGS. 8B, 8D, and 8F, the larger the rotation angle of the second lens array 33 is, the larger the condensing diameter of the laser beam condensed on the sheet metal W is. By increasing the rotation angle of the second lens array 33, the size of the condensing diameter is increased. Thereby, it is possible to widen a cut slit width of the sheet metal W. In other words, by adjusting the rotation angle of the second lens array 33, the size of the condensing diameter of the laser beam condensed onto the sheet metal W by the condensing lens 36 is adjusted. Thereby, it is possible to change a slit width of cutting.

Thus, although the energy density of the laser beam emitted to the sheet metal W is lowered when the condensing diameter of the laser beam with the same energy amount is increased without changing a beam-parameter product, in the present embodiment, it is possible to set a plurality of areas with a high absorption rate to the sheet metal W while maintaining a high laser absorption rate at the incident angle close to the Brewster angle. As a result, it is possible to melt the sheet metal W with the condensing diameter that can ensure the slit width corresponding to the thickness of the sheet metal W.

To give a summary once again, as is understood from FIGS. 8A, 8C, 8E, 8B, 8D, and 8F, since the beam diameter of the laser beam emitted to the condensing lens 36 hardly changes regardless of whether or not the second lens array 33 is rotated, the incident angle of the laser beam to the metal sheet W does not change. However, since it is possible to set the areas having a high absorption rate by the rotation of the second lens array 33, the size of the condensing diameter of the laser beam condensed onto the sheet metal W is adjusted. Thereby, it is possible to change the slit width of the cutting.

In the embodiment described above, a case is described in which the position of the first microlens L1 and the position of the corresponding second microlens L2 are shifted by a predetermined angle by rotating the second lens array 33. However, the present disclosure is not limited to this, and a similar effect can be obtained by rotating at least one of the first lens array 32 and the second lens array 33 so as to relatively shift the corresponding microlens by a predetermined angle. For example, by rotating the first lens array 32 or rotating both the first lens array 32 and the second lens array 33 in opposite directions, the position of the first microlens L1 and the position of the second microlens L2 may be relatively shifted by a predetermined angle.

Further, in the embodiment described above, a case is described in which the plurality of first microlenses L1 in the first lens array 32 and the plurality of second microlenses L2 in the second lens array 33 in the collimator unit 30 are the regular hexagons, respectively. However, the present disclosure is not limited to this, and any shape may be used as long as the adjacent microlenses can be arranged without a gap. For example, a rectangular may be used.

Further, in the embodiment described above, a case is described in which the first microlens L1 and the second microlens L2 are each structured by a convex lens, but the present disclosure is not limited to this. The first microlens L1 may be structured by a convex lens, and the second microlens L2 may be structured by a concave lens.

Further, in the embodiment described above, a case is described in which the first lens array 32 and the second lens array 33 are arranged between the collimating lens 31 and the condensing lens 36. By structuring in this manner, the arrangement positions of the first lens array 32 and the second lens array 33 can be easily set. However, the present disclosure is not limited to this structure, and the first lens array 32 and the second lens array 33 may be arranged between the process fiber 12 and the collimating lens 31, or between the condensing lens 36 and the focusing point.

Further, the laser processing machine 100 described above may be equipped with a zooming function that adjusts the focal length of the laser beam.

The present disclosure is not limited to the present embodiments described above, and various modifications can be made within a scope not deviating from the summary of the present disclosure.

The disclosure of the present application relates to the subject matter described in Japanese Patent Application No. 2021-029795 filed on Feb. 26, 2021, and all disclosures thereof are incorporated herein by reference.

The invention claimed is:

1. A laser processing machine, comprising:
   a collimating lens configured to convert an incident laser beam into a collimated beam;
   a condensing lens configured to focus the converted collimated beam so as to irradiate a sheet metal;
   a first lens array structured by arranging a plurality of first microlenses in a planar shape so as to refract the incident laser beam by each of the first microlenses;

a second lens array structured by arranging a plurality of second microlenses in a planar shape to be in a same shape as the first lens array so that a center of the second lens array is set at a same position in an optical axis direction as a center of the first lens array so as to make the laser beam emitted from each of the microlenses of the first lens array incident and refracted by a corresponding one of the second microlenses; and
   a rotation mechanism configured to rotate at least one of the first lens array and the second lens array along an outer periphery of the at least one of the first lens array and the second lens array.

2. The laser processing machine according to claim 1, wherein each microlens of the first lens array and each microlens of the second lens array are formed in a regular hexagon or a square.

3. The laser processing machine according to claim 1, wherein a focal length of each microlens of the second lens array is set shorter than a focal length of each microlens of the first lens array.

4. The laser processing machine according to claim 1, wherein the first lens array and the second lens array are arranged between the collimating lens and the condensing lens.

5. A laser processing method performed by the laser processing machine according to claim 1, the laser processing method comprising rotating at least one of the first lens array and the second lens array along the outer periphery of the at least one of the first lens array and the second lens array by a predetermined angle with the rotation mechanism such that a condensing diameter of a laser beam condensed by the condensing lens becomes a predetermined size.

* * * * *